March 6, 1962  JOHN R. OISHEI ETAL  3,023,445
WINDSHIELD WIPING SYSTEM
Filed Jan. 12, 1959
2 Sheets-Sheet 1

INVENTOR.
JOHN R. OISHEI and
BY MARTIN BITZER
Bean Brooks Buckley + Bean
ATTORNEYS INVENTOR.
JOHN R. OISHEI and
BY MARTIN BITZER
Bean Brooks Buckley & Bean
ATTORNEYS

United States Patent Office 3,023,445
Patented Mar. 6, 1962

3,023,445
WINDSHIELD WIPING SYSTEM
John R. Oishei, Buffalo, and Martin Bitzer, Kenmore, N.Y., assignors to Trico Products Corporation, Buffalo, N.Y.
Filed Jan. 12, 1959, Ser. No. 786,179
3 Claims. (Cl. 15—250.12)

This invention relates to an improved vehicle windshield cleaning system.

In a windshield wiper system, the use of a fluid pressure motor actuated by engine intake manifold vacuum is well known. The advantages of this type of fluid pressure motor are its relatively low cost; its ability to give years of trouble-free service without any maintenance requirement; and its characteristic of utilizing by-product power from the vehicle, namely, the suction created by the engine intake manifold, to produce motion to drive the windshield wipers without adding any apreciable load to existing power sources in the vehicle. However, the speed of this type of motor varies with the amount of vacuum produced in the engine intake manifold which unavoidably fluctuates with variations in operational conditions of the engine. Recent developments in the automotive field, however, have provided a readily available source of compressed air within the vehicle for the operation of various accessories, such as air suspension. The present invention is concerned with utilizing this compressed air source to cause a primarily vacuum operated windshield wiper motor to produce a constant speed output.

It is accordingly one object of this invention to provide a fluid pressure operated windshield wiper system in which the windshield wiper motor is always driven at a substantially constant speed, either solely by engine intake manifold vacuum, or by a combination of this vacuum and a small amount of readily available compressed air when the manifold vacuum falls below the value which will maintain the speed of the wiper motor constant.

Another object of the present invention is to provide an automotive windshield cleaning system which is efficient in operation and economical to both manufacture and operate. Other objects and attendant advantages of the present invention will readily be perceived hereafter.

In accordance with the foregoing objects, the present invention relates to an improved windshield wiper system wherein a fluid pressure motor is normally driven by the engine intake manifold vacuum. During most conditions of vehicle operation, the manifold vacuum is of a sufficiently high value, and the motor will operate solely under its influence. However, when the manifold vacuum drops below the amount necessary to maintain the speed of the motor at a given value, a control arrangement permits compressed air to be supplied to the wiper motor in an amount required to supplement the force produced by the vacuum to maintain the speed of the wiper motor substantially constant. The advantage of the foregoing arrangement is that during the major part of its operation, the motor is driven by the intake manifold vacuum, which is a by-product of vehicle operation, and it is only during the infrequent instances when the vacuum drops, that compressed air, which is always available, is used to supplement the force produced by the vacuum to thereby give a system which retains all of the above-mentioned advantageous features of the proved fluid pressure wiper motor, and, in addition, provides the additional advantage of producing a substantially constant speed output in an economical manner. The present invention will be more fully understood when the following portions of the specification are read in conjunction with the accompanying drawings wherein:

Figure 1:
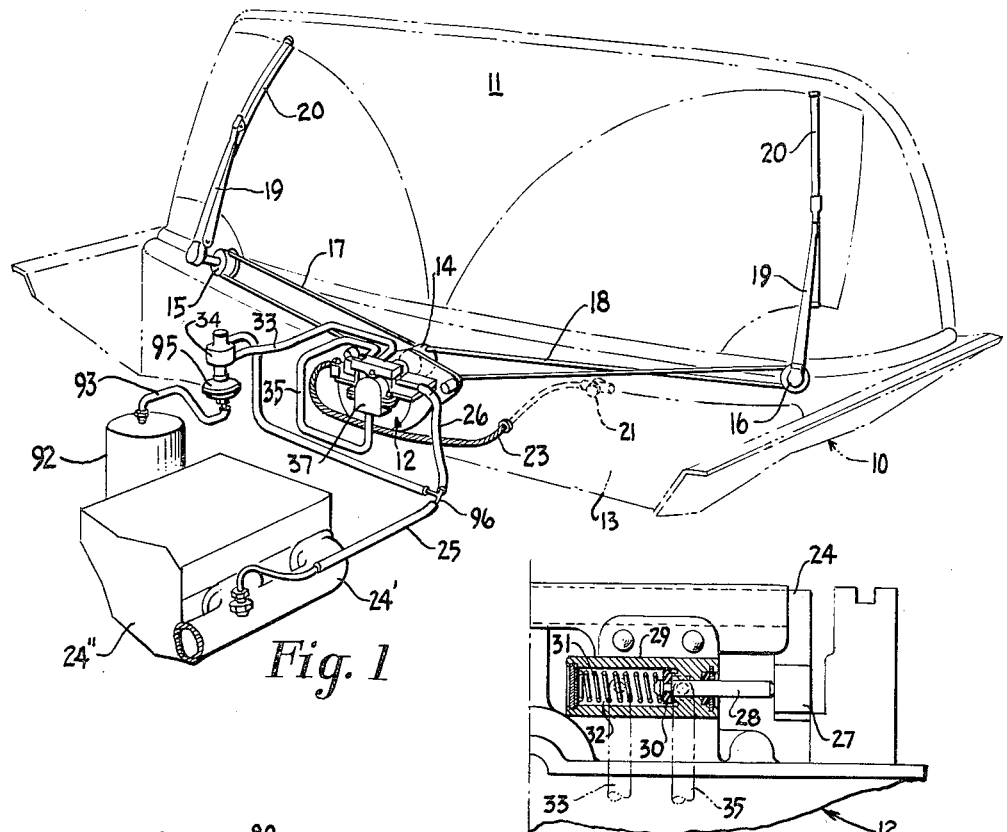
FIG. 1 is a fragmentary perspective view of an automotive vehicle containing the improved wiper system.

In FIG. 1, a portion of an automotive vehicle 10 is shown having a windshield 11 mounted thereon. A windshield wiper motor 12, which may be suitably mounted on the firewall 13 of the vehicle, is adapted to cause oscillation of drum 14 coupled thereto which is linked to pulleys 15 and 16 by flexible cables 17 and 18. Pulleys 15 and 16 are in turn mounted on rockshafts (not numbered) journaled in the cowl of the vehicle, the rockshafts also mounting wiper arms 19 on which are mounted wiper blades 20 in any conventional manner. It will readily be appreciated that when motor 12 is placed in operation, as described in detail hereafter, it will cause oscillation of wiper blades 20 across windshield 11.

In order to place the windshield wipers in operation, a manual control 21 is mounted on the vehicle dashboard (not shown). The manipulation of this control will cause core 22 (FIG. 2) of Bowden wire unit 23 to move the slide valve 24 of motor 12 to permit vacuum to communicate with motor 12 from intake manifold 24' of engine 24" through conduits 25 and 26.

Figure 3:
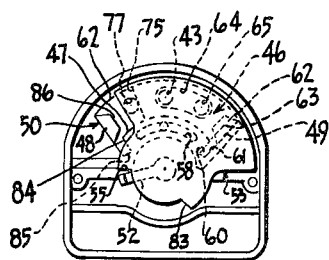
FIG. 3 is a view of the rear of the fluid pressure wiper motor taken generally from the direction of the arrows III—III of FIG. 2, certain portions of FIG. 3 being in cross-section.
Figure 2:
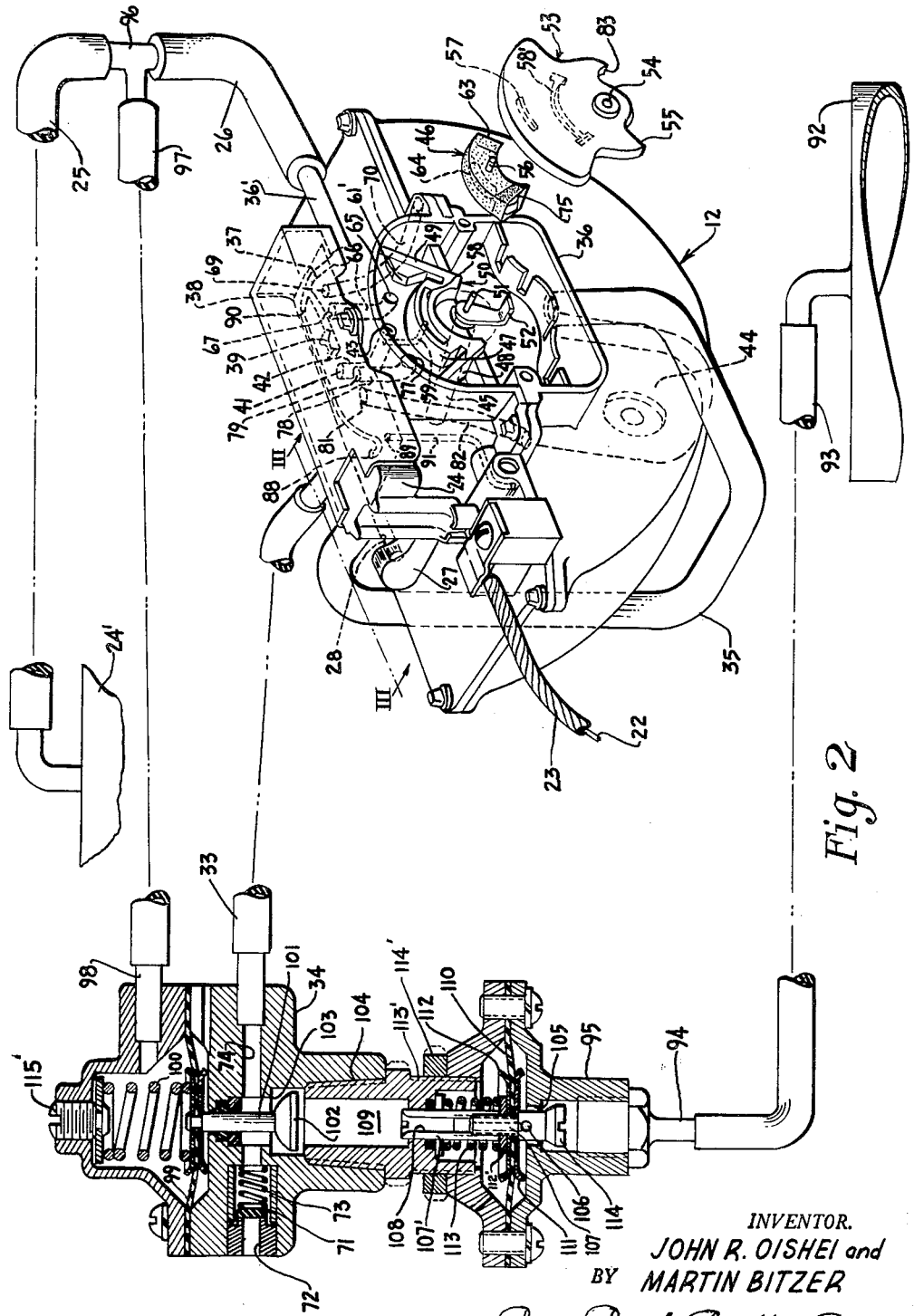
FIG. 2 is an enlarged view of the improved wiper system portions of this view being in perspective, portions being in exploded form, and other portions being in cross-section.

When the slide valve 24 has been moved to the right in FIG. 2 (or to the left in FIG. 3), an arm 27 (FIGS. 2 and 3) attached thereto will move pin 28 to the left in FIG. 3. Pin 28 is the valve stem of valve 29 which is mounted on the rear of motor 12. Valve 29 prevents a source of compressed air from communicating with motor 12 when slide valve 24 is in an off position. However, as valve stem 28 moves to the left in response to a corresponding movement of slide valve 24 to an "on" position, poppet valve 30 (FIG. 3) which is mounted on stem 28, will be moved away from its seat (not numbered) against the bias of spring 31 mounted in valve chamber 32. This action will permit the communication between conduit 33, which has one end thereof coupled to master control means or valve 34 and the other end in communication with chamber 32, and conduit 35, which has one end thereof in communication with valve 29 and the other end thereof in communication with pressurized control housing 36 of motor 12. At this point it will be noted that a cover 37 (FIG. 1) is provided for control housing 36 (FIG. 2) and a suitable air-tight gasket (not shown) is interposed between the two to prevent leakage therebetween to the atmosphere.

As noted above, the present fluid pressure windshield wiper motor system can operate solely under the influence of manifold vacuum or under the influence of manifold vacuum supplemented by positive pressure from a compressed air source in the event that the manifold vacuum is not of a sufficient value to maintain the desired motor speed. When the manifold vacuum or suction is of a sufficient value to operate the motor, the following occurs: As noted above, the engine intake manifold 24' is coupled to motor 12 through conduits 25 and 26, the latter having an end thereof mounted on nipple 36' extending from motor 12. A conduit 37 within valve seat 38 (FIGS. 2 and 4) is in communication with nipple 36' and leads to port 39 in the valve face. When the slide valve 24 is in a motor operating position, groove 40 of slide valve 24 (FIG. 4) bridges port 39 and port 41 in the valve seat. This permits vacuum to communicate to control housing 36 through conduit 42 leading from port 41, port 43 being formed at the other end of this conduit.

Positioned within control housing 36 is a timing and pressure distributing assembly in the form of automatic valve mechanism for causing oscillation of piston 44 which is mounted on shaft 45 which is, in turn, suitably journaled in the motor. This assembly consists of a shuttle valve 46 (FIGS. 2, 5 and 6) which rides back and forth on base 47 between walls 48 and 49 of sub-housing 50. Rigidly mounted against rotational movement on reduced diameter portion 51 of shaft 45 is a kicker 52. A pilot shuttle 53 has an aperture 54 therein (FIG. 2) which is adapted to fit on reduced diameter shaft 51. As the piston 44 approaches its extreme clockwise limit of movement, kicker 52 will engage leg 55 of pilot shuttle 53 and cause it to pivot in a clockwise direction to the position shown in FIG. 5 from its position in FIG. 6. A pin 56 (FIG. 2) which is affixed to shuttle 46 is positioned in slot 57 of pilot shuttle 53. As pilot shuttle 53 pivots in a clockwise direction, the left end of slot 57 will engage pin 56 and cause it to move on base 47 in a generally clockwise direction. A groove 58' in pilot kicker 53 overlies groove 58 in sub-housing 50. When pilot shuttle 53 reaches its limit of clockwise travel, there will be a communication of vacuum from conduit 42 through conduit 59, groove 58, groove 58' in pilot shuttle 53, to the chamber defined by base 47, the plurality of walls 60, 61, and 62, the end 63 of shuttle 46, and the rear face of pilot shuttle 53. In other words, groove 57 and pin 56 move shuttle 46 to the right until it covers aperture 65. Once aperture 65 has been covered, the above defined chamber is fluid tight and the vacuum induced therein will cause shuttle 46 to be pulled in a clockwise direction until it abuts stop 61'. After shuttle 46 has been pulled to this position, the groove 64 therein will cause communication between port 43 in conduit 42 and port 65 which is the end of conduit 66 (FIG. 2) leading to port 67 in the valve face.

However, when the motor is in a running position, groove 68 (FIG. 4) in slide valve 24 bridges port 67 and port 69 adjacent thereto, the latter being the terminus of conduit 70 leading through the head of the motor and having the lower portion thereof in communication with the chamber defined by piston 44 and the walls of motor 12 to the right thereof. The inducing of vacuum in this chamber in the above described manner creates an unbalance of pressure across the piston 44 relative to the atmosphere because atmospheric pressure exists in the chamber of motor 12 defined by piston 44 and the motor housing walls to the left thereof because the atmospheric pressure unseats poppet valve 71 in master valve 34 (FIG. 2) when the piston 44 tends to move under the influence of vacuum. Poppet valve 71 closes an end of conduit 72 in valve 34, said conduit having one end thereof in communication with the atmosphere. When valve 71 is unseated against the bias of spring 73, which tends to hold it in the position shown in the drawing, the atmosphere may communicate with control housing 36 through conduit 74 in valve 34, conduit 33 leading to valve chamber 32 (FIG. 3) and conduit 35. Since pilot shuttle 53 and shuttle 46 are in their extreme clockwise positions, the left end 75 of shuttle 46 will be to the right of aperture 77 (FIG. 5) in the rear face of the control housing and the atmosphere may communicate with this aperture because pilot shuttle 53 is moved sufficiently to the right to uncover the end portion of sub-housing 50. The atmospheric pressure in communication with port 59 will thus be transmitted through conduit 78, port 79 in the slide valve seat (FIGS. 2 and 3), groove 80 of slide valve 24, port 81 and conduit 82 which is in communication with the chamber to the left of piston 44. The differential pressure across the faces of piston 44 will thus cause it to move in a counterclockwise direction.

Figure 4:
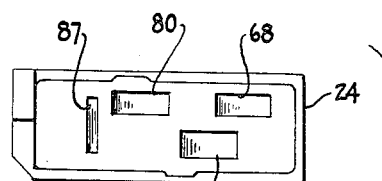
FIG. 4 is an open-face view showing the relationship between the slide valve and valve seat of the fluid pressure motor.
Figure 6:
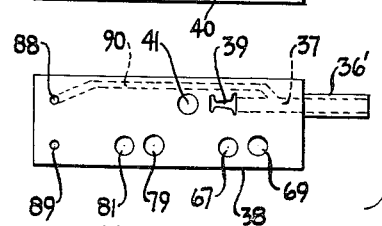
FIG. 6 is a view similar to FIG. 5, but showing the position of the valves when the motor piston reaches its limit of counterclockwise movement.
Figure 5:
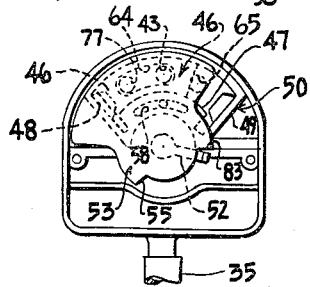
FIG. 5 is a view of the position occupied by the valves in the control housing of the wiper motor when the motor piston reaches its limit of clockwise movement.

When the piston 44 approaches its limit of counterclockwise travel, the kicker 52 on reduced portion 51 of shaft 45 will abut leg 83 of pilot shuttle 53 and cause the latter to pivot in a counterclockwise direction to the position shown in FIG. 6 from its position shown in FIG. 5. The right end portion of slot 57 in pilot shuttle 53 will engage pin 56 of shuttle 46 and move the latter in a counterclockwise direction also until it covers aperture 77. However, groove 58' in pilot shuttle 53 will now be in a position where it causes vacuum to communicate through groove 58 and groove 58' to the now fluid tight chamber defined by the base 47 of sub-housing 50 and the walls 84, 85, 86, the portion of wall 62 to the left of end 75 of shuttle 46 and the rear face of pilot shuttle 53. This will cause shuttle 46 to be pulled in a counterclockwise direction to the limit permitted by wall 86. In so doing, groove 64 therein will cause communication between port 43 leading from the vacuum source and port 77 at the end of conduit 78 (FIG. 2). Vacuum will thus be caused to communicate from conduit 78 through orifice 79 in the valve seat (FIG. 4), groove 80 in slide valve 24, orifice 81 and conduit 82 leading to the chamber to the left of piston 44. By the same action wherein shuttle 46 causes communication between apertures 43 and 77, aperture 65 of conduit 66 is uncovered. The atmosphere which exists in conduit 35 (because of the above described construction) will communicate with the chamber to the right of motor piston 44 through the pressurized control housing 36 and the portion of the sub-housing 50 which is uncovered and to the right of shuttle 46 when shuttle 46 and pilot shuttle 53 are in their extreme counterclockwise positions shown in FIG. 6. It will, of course, be understood that the foregoing sequence of events repeats itself numerous times per minute to apply pressure and vacuum alternately to opposite sides of the piston to cause the motor 12 to produce the oscillatory action required to actuate the windshield wipers. It is to be understood that the foregoing type of action of the present system is obtained when the manifold vacuum is of a value which will cause motor 12 to operate at a predetermined speed.

Whenever it is desired to terminate operation of the wiper motor 12, control 21 is manipulated to cause core 22 of Bowden wire unit 23 to move to the left in FIG. 2. This will cause a corresponding movement of slide valve 24 to the left relative to the valve face (FIGS. 2 and 4) and thereby cause groove 87 in slide valve 24 to bridge ports 88 and 89 in the valve face (FIG. 4). Port 88 is one terminus of conduit 90 (underneath the valve face) the other end of which is in communication with conduit 37 communicating with nipple 36' which is connected to the vacuum source. It will also be noted that when slide valve 24 is moved to the left in FIG. 4 to cause groove 87 to bridge ports 88 and 89, groove 40 will no longer bridge ports 39 and 41, groove 80 will no longer bridge ports 79 and 81, and groove 68 will not bridge ports 67 and 69. When the slide valve 24 is in a parked position, the end thereof will be beyond port 69 which will therefore be exposed to the atmosphere. The atmosphere will thus be able to communicate with the chamber to the right of piston 44 through port 69 and conduit 70 while vacuum communicates with the chamber to the left of piston 44 through conduit 91. Thus vacuum applied to the chamber to the left of piston 44 and atmospheric pressure to the right thereof will cause the latter to move to a parked position, and operation of the motor 12 will terminate.

As explained above, during operation of the vehicle there are times when the manifold vacuum will drop, as when the vehicle is accelerated. In the past, this reduction in manifold vacuum caused a slowing down of the motor 12 because of the reduction of the pressure differential across the face of motor piston 44. In accordance with the present invention, whenever a drop in manifold vacuum is experienced, a control arrangement within the wiper system will automatically cause a positive pressure from a compressed air source to be supplied to the face of the piston opposite to that on which vacuum is exerted, the positive pressure being of a magnitude which will maintain the pressure differential across the piston at a constant value with the resultant maintaining of the speed of the motor at a constant value. The compressed air operates through the same conduits in the motor which are otherwise used to conduct atmospheric air when the motor is operating solely by the use of vacuum.

The source of positive pressure is compressed air tank 92 (FIGS. 1 and 2) which is a part of the standard equipment of the vehicle. A compressor (not shown) is ordinarily driven by a belt connection to the drive shaft of the vehicle engine. This compressor is always in operation when the engine is running and thus maintains the amount of compressed air within storage tank 92 at a predetermined value, as governed by an appropriate pressure regulating device. One end of a conduit 93 (FIGS. 1 and 2) is coupled to tank 92 and the other end of conduit 93 is mounted on nipple 94 of pressure regulating valve 95, the latter being connected to master control valve 34 for joint operation therewith in a manner to be described hereafter.

It will be noted that a T 96 (FIGS. 1 and 2) couples conduits 25 and 26 which supply vacuum to wiper motor 12. The third leg of the T is coupled to one end of conduit 97, the other end of which is mounted on nipple 98 communicating with master valve 34. When the vacuum produced by manifold 24 is of a sufficiently high value to maintain the speed of motor 12 at a desired rate, it will also be of sufficient magnitude to cause diaphragm 99 within the housing of valve 34 to be pulled upwardly against the bias of spring 100. A stem 101, which has one end thereof suitably affixed to diaphragm 99, has a valve 102 mounted on the other end thereof. When the vacuum is sufficiently high, valve 102 will be seated on seat 103 and thereby prevent compressed air from communicating with conduit 33 through conduit 93, valve 95, and valve 34. When the vacuum is of the magnitude which will maintain valve 102 closed, the atmospheric air requirements for motor 12 will be obtained through poppet valve 71 in the above described manner.

However, there will be times, primarily during vehicle acceleration, when the manifold vacuum drops below a value which is required to maintain the speed of the wiper motor at a preset rate. When this occurs, spring 100 will force diaphragm 99 downwardly against the upward force produced thereon by the vacuum and thereby cause valve 102 to unseat from seat 103. The lower portion of control valve 34 is tapped, and a mating threaded portion of nipple 113' leading from valve 95 is joined to valve 34, as at 104. When poppet valve 102 is in the open position, compressed air may pass from tank 92 to conduit 33 leading to motor 12 through conduit 93, nipple 94, orifice 105 of valve 95, aperture 106 in valve stem 107, conduit 108 (in valve stem 107) in communication with aperture 106, chamber 109 of nipple 113', and conduit 74 in master control valve 34. The existence of positive pressure within conduit 74 will supplement the force of spring 73 maintaining poppet valve 71 in a closed condition to prevent the compressed air from being vented to the atmosphere through valve aperture 72. It will also be noted that the pressure at which valve 102 opens may be adjusted by the use of adjusting screw 115' which varies the force of spring 100.

The pressure within cylinder 92 is of a magnitude which is far in excess of that required for operation of wiper motor 12. Reducing valve 95 performs the function of creating a pressure drop to reduce the pressure of the compressed air passing therethrough. To this end, a flexible diaphragm 110 is located within valve 95. Valve stem 107 is mounted on diaphragm 110 by dished washers 111 and 112. The lower dished washer 111 rests on a shoulder (not numbered) of stem 107 and the upper washer 112 rests on flexible diaphragm 110. A tubular upper nipple 107', threaded on stem 107, is in abutting relationship with washer 112' on upper washer 112 to hold the valve stem assembly on diaphragm 110. A spring 113 has one end thereof bearing against washer 112' and the other end thereof bearing against a fixed abutment (not numbered) within nipple 113', the latter being threaded into the upper portion of valve 95. The foregoing arrangement is calibrated so that when the pressure within cylinder 92 increases above its normal value, diaphragm 110 will tend to deflect upwardly against the bias of spring 113 and thereby cause the valve 114 mounted on stem 107 to approach its seat (not numbered) thereby reducing the orifice through which the compressed air passes and accordingly creating a greater pressure drop through valve 95 to thereby maintain the pressure of the compressed air which is supplied to master control valve 34 at a substantially constant value. On the other hand, should the pressure within cylinder 92 drop below its normal value, the spring 113 will cause diaphragm 110 to move downwardly against the force exerted by the compressed air and cause a correspondingly greater opening between valve 114 and its associated seat to thereby cause a lesser pressure reduction across this valve, and in this manner maintain the pressure supplied to master control valve 34 at a substantially constant value. It will thus be noted that the pressure within chamber 109 which is adjacent to poppet valve 102 of valve 34 is maintained at a substantially constant value due to the above described action of pressure reducing valve 95. It is to be noted that the value at which valve 114 will operate may be adjusted by varying the force of spring 113. This is accomplished by threading nipple 113' into or out of the top of valve 95 and then securing these elements in position by tightening lock nut 114'.

As noted above, when the manifold vacuum is of a sufficiently high value to maintain motor 12 operating at the desired rate of speed, diaphragm 99 of valve 34 will maintain poppet valve 102 closed. However, when this manifold vacuum drops below the required value, there is a reduction in vacuum above diaphragm 99 and spring 100 will cause valve 102 to move off of its seat 103, thereby admitting compressed air to conduit 33 and converting it into a positive leading to motor 12. The amount of movement of poppet valve 102 from its seat 103 varies with the reduction in manifold vacuum. Thus it will readily be appreciated that when the manifold vacuum has decreased a great amount, there will be a relatively large opening between valve 102 and seat 103, and there will be a relatively high compressed air pressure communicated through conduit 33 to motor 12 to compensate for the relatively large loss in vacuum supplied to motor 12. On the other hand, should the manifold vacuum decrease slightly from the optimum value necessary to run motor 12, there will be a slight opening of valve 102 and this slight opening, in turn, will cause compressed air to be supplied to motor 12 at a relatively low pressure to supplement the force of the vacuum on piston 44 of motor 12. It will be appreciated, therefore, that in order to maintain the speed of motor 12 constant, the pressure differential across piston 44 must be maintained at a relatively constant value regardless of whether this pressure differential is achieved by vacuum on one side of the piston and atmosphere on the other, or whether it is achieved by vacuum on one side and compressed air on the other side. As explained above, the valving arrangement including master control valve 34 maintains the pressure differential across piston 44 at a relatively constant value whether the combination of vacuum and atmosphere or the combination of vacuum and compressed air is being used to operate the wiper motor.

It is believed unnecessary to give a detailed explanation of the operation of motor 12 when under the influence of a combination of vacuum and compressed air. It is merely necessary to understand that the same conduits within motor 12 are used under the foregoing condition as are used when the motor is operating by a combination of vacuum and atmospheric pressure, the only difference being that compressed air is supplied to the high pressure side of piston 44 through the same conduits in the motor which are otherwise used for atmospheric air. As explained above, when the compressed air is being used, valve 71 in master control valve 34 is closed to prevent atmospheric air pressure from interfering with the operation of motor 12.

It will thus be seen that a fluid pressure operated windshield wiper system has been disclosed which is capable of operating under the influence of manifold vacuum and atmospheric pressure under most conditions of vehicle operation, but when the manifold vacuum drops below a predetermined value necessary to maintain the desired rate of speed of the motor, an automatic control which is sensitive to the manifold vacuum supplies compressed air to the windshield wiper motor instead of air at atmospheric pressure. In this manner, the pressure differential across the motor piston is maintained at a relatively constant value, and as a corollary, the speed of the windshield wiper motor is maintained constant under all conditions of vehicle operation.

While a preferred embodiment of the present invention has been disclosed, it is to be understood that it is not to be limited thereto, but may be otherwise embodied within the scope of the following claims.

What is claimed is:

1. A windshield cleaner system comprising, in combination, a wiper, a fluid motor for operating the same, an intake manifold constituting a source of fluctuating negative pressure; said fluid motor having a chamber with a relatively movable member dividing the chamber, and an automatic valve mechanism operatively applying negative and atmospheric pressures through port means to said motor chamber; a master control unit having an atmospheric pressure passage leading to the valve mechanism and a negative pressure passage communicating with the manifold, said master control unit also having a positive pressure passage opening into the atmospheric passage but normally closed by a valve in the unit, means in the unit responsive to a predetermined drop in the fluctuating negative pressure for opening the valve to admit positive pressure from a connected source through said atmospheric pressure passage to the valve mechanism for maintaining wiper operation, and valve means closing off the atmospheric pressure passage to the outside atmosphere when being used for transmitting the positive pressure to the valve mechanism.

2. A windshield cleaner system according to claim 1, wherein said positive pressure passage opens into the atmospheric passage adjacent to but downstream from said valve means, said valve means being normally closed by a light spring yieldable to admit atmospheric pressure for normal wiper operation, said master control unit being mountable and demountable as an entirety.

3. A windshield cleaner system according to claim 1, wherein means are provided in the unit upstream from the normally closed valve for regulating the magnitude of the positive pressure to be supplied when said normally closed valve opens in response to the drop in the fluctuating negative pressure.

References Cited in the file of this patent
UNITED STATES PATENTS

| | | |
|---|---|---|
| 2,095,833 | Rockwell | Oct. 12, 1937 |
| 2,520,650 | Oishei et al. | Aug. 29, 1950 |